United States Patent
Wilson et al.

(10) Patent No.: US 9,589,382 B2
(45) Date of Patent: Mar. 7, 2017

(54) RENDER SETUP GRAPH

(71) Applicant: DreamWorks Animation LLC, Glendale, CA (US)

(72) Inventors: Robert Giles Wilson, Burbank, CA (US); Evan P. Smyth, Glendale, CA (US); Mark Lee, Glendale, CA (US); Max Requenes, Glendale, CA (US); Peter McNerney, Glendale, CA (US)

(73) Assignee: DreamWorks Animation LLC, Glendale, CA (US)

( * ) Notice: Subject to any disclaimer, the term of this patent is extended or adjusted under 35 U.S.C. 154(b) by 227 days.

(21) Appl. No.: 13/844,363

(22) Filed: Mar. 15, 2013

(65) Prior Publication Data

US 2014/0267309 A1    Sep. 18, 2014

(51) Int. Cl.
| | | |
|---|---|---|
| *G06T 11/20* | (2006.01) | |
| *G06T 13/00* | (2011.01) | |
| *G06T 13/20* | (2011.01) | |
| *G06T 15/50* | (2011.01) | |
| *G06T 19/00* | (2011.01) | |

(52) U.S. Cl.
CPC .............. *G06T 13/00* (2013.01); *G06T 13/20* (2013.01); *G06T 15/506* (2013.01); *G06T 19/00* (2013.01); *G06T 2210/61* (2013.01)

(58) Field of Classification Search
None
See application file for complete search history.

(56) References Cited

U.S. PATENT DOCUMENTS

| 4,922,413 A | * | 5/1990 | Stoughton et al. ............ 712/26 |
| 5,307,295 A | | 4/1994 | Taylor et al. |

(Continued)

FOREIGN PATENT DOCUMENTS

| EP | 1918880 A2 | 5/2008 |
| EP | 1918881 A2 | 5/2008 |

(Continued)

OTHER PUBLICATIONS

"Intro to Animation", Power Point Presentation, available online at <http://visservices.sdsc.edu/courses/maya/spring06/introtoanim.ppt>, accessed on Apr. 30, 2013, 32 pages.

(Continued)

*Primary Examiner* — M Good Johnson
(74) *Attorney, Agent, or Firm* — Morrison & Foerster LLP

(57) ABSTRACT

Systems and methods for rendering an image using a render setup graph are provided. The render setup graph may be used to configure and manage lighting configuration data as well as external processes used to render the computer-generated image. The render setup graph may include a dependency graph having nodes interconnected by edges along which objects and object configuration data may be passed between nodes. The nodes may be used to provide a source of objects and object configuration data, configure visual effects of an object, partition a set of objects, call external processes, perform data routing functions within the graph, and the like. In this way, the render setup graph may advantageously be used to organize configuration data and execution of processes for rendering an image.

24 Claims, 8 Drawing Sheets

(56) References Cited

U.S. PATENT DOCUMENTS

| | | | |
|---|---|---|---|
| 5,329,360 A | 7/1994 | Gillard et al. | |
| 5,438,661 A | 8/1995 | Ogawa | |
| 5,675,752 A | 10/1997 | Scott et al. | |
| 5,808,617 A | 9/1998 | Kenworthy et al. | |
| 5,808,625 A * | 9/1998 | Picott et al. | 345/440 |
| 5,896,139 A | 4/1999 | Strauss | |
| 5,936,628 A | 8/1999 | Kitamura et al. | |
| 5,982,389 A * | 11/1999 | Guenter et al. | 345/474 |
| 5,986,667 A * | 11/1999 | Jevans | 345/619 |
| 6,154,215 A * | 11/2000 | Hopcroft et al. | 345/418 |
| 6,243,856 B1 * | 6/2001 | Meyer et al. | 717/146 |
| 6,252,608 B1 | 6/2001 | Snyder et al. | |
| 6,263,103 B1 | 7/2001 | Freeman et al. | |
| 6,263,496 B1 | 7/2001 | Meyer et al. | |
| 6,272,650 B1 | 8/2001 | Meyer et al. | |
| 6,362,822 B1 | 3/2002 | Randel | |
| 6,496,190 B1 | 12/2002 | Driemeyer et al. | |
| 6,556,200 B1 | 4/2003 | Pfister et al. | |
| 6,563,504 B1 | 5/2003 | Rose et al. | |
| 6,611,262 B1 | 8/2003 | Suzuki | |
| 6,760,485 B1 | 7/2004 | Gilman et al. | |
| 6,919,891 B2 | 7/2005 | Schneider et al. | |
| 7,174,039 B2 | 2/2007 | Koo et al. | |
| 7,414,626 B1 | 8/2008 | Picott | |
| 7,439,982 B2 | 10/2008 | Deniau et al. | |
| 7,548,238 B2 | 6/2009 | Berteig et al. | |
| 7,911,472 B2 | 3/2011 | Harper | |
| 7,920,143 B1 | 4/2011 | Haratsch et al. | |
| 8,009,176 B2 | 8/2011 | Zimmer | |
| 8,259,110 B1 | 9/2012 | Carr et al. | |
| 8,274,506 B1 | 9/2012 | Rees | |
| 8,339,402 B2 | 12/2012 | Henson et al. | |
| 8,352,397 B2 | 1/2013 | Rubin et al. | |
| 8,352,443 B1 | 1/2013 | Polson et al. | |
| 8,369,564 B2 | 2/2013 | Hervas et al. | |
| 8,612,485 B2 * | 12/2013 | Selan et al. | 707/796 |
| 8,624,898 B1 | 1/2014 | Bugaj et al. | |
| 8,773,433 B1 | 7/2014 | Smyrl | |
| 2001/0027388 A1 | 10/2001 | Beverina et al. | |
| 2002/0063704 A1 | 5/2002 | Sowizral et al. | |
| 2002/0099684 A1 | 7/2002 | Ardoin et al. | |
| 2002/0128841 A1 | 9/2002 | Kibre et al. | |
| 2002/0140707 A1 | 10/2002 | Samra et al. | |
| 2002/0163518 A1 | 11/2002 | Rising, III et al. | |
| 2002/0188613 A1 | 12/2002 | Chakraborty et al. | |
| 2003/0156117 A1 | 8/2003 | Higuchi et al. | |
| 2004/0052450 A1 | 3/2004 | Morrison | |
| 2004/0109501 A1 | 6/2004 | Wollborn | |
| 2004/0160445 A1 * | 8/2004 | Whatmough | 345/473 |
| 2004/0189668 A1 * | 9/2004 | Beda et al. | 345/619 |
| 2004/0194020 A1 | 9/2004 | Beda et al. | |
| 2004/0222989 A1 | 11/2004 | Zhang et al. | |
| 2004/0222992 A1 * | 11/2004 | Calkins et al. | 345/473 |
| 2005/0039176 A1 | 2/2005 | Fournie et al. | |
| 2005/0110790 A1 * | 5/2005 | D'Amora | 345/419 |
| 2005/0140672 A1 | 6/2005 | Hubbell | |
| 2005/0140694 A1 * | 6/2005 | Subramanian et al. | 345/619 |
| 2005/0248565 A1 | 11/2005 | Grassia et al. | |
| 2005/0253839 A1 | 11/2005 | Bugaj et al. | |
| 2005/0256950 A1 | 11/2005 | Suzuki | |
| 2005/0262470 A1 | 11/2005 | Gavrilov | |
| 2006/0176403 A1 | 8/2006 | Gritton et al. | |
| 2007/0080964 A1 | 4/2007 | Kainz et al. | |
| 2007/0146361 A1 | 6/2007 | Hayashi et al. | |
| 2007/0176926 A1 | 8/2007 | Garcia et al. | |
| 2007/0185881 A1 | 8/2007 | Vienneau et al. | |
| 2008/0028414 A1 | 1/2008 | Couture-Gagnon et al. | |
| 2008/0049033 A1 | 2/2008 | Yang | |
| 2008/0109717 A1 | 5/2008 | Krauter | |
| 2008/0117216 A1 | 5/2008 | Dorie | |
| 2008/0122838 A1 | 5/2008 | Hoover et al. | |
| 2008/0231633 A1 | 9/2008 | Keller et al. | |
| 2008/0238916 A1 | 10/2008 | Ghosh et al. | |
| 2008/0278482 A1 | 11/2008 | Farmanbar et al. | |
| 2009/0021513 A1 | 1/2009 | Joshi et al. | |
| 2009/0027380 A1 | 1/2009 | Rajan et al. | |
| 2010/0079462 A1 | 4/2010 | Breeds et al. | |
| 2010/0086200 A1 | 4/2010 | Stankiewicz et al. | |
| 2010/0123723 A1 | 5/2010 | Collard et al. | |
| 2010/0134501 A1 | 6/2010 | Lowe et al. | |
| 2010/0177104 A1 | 7/2010 | Dufour et al. | |
| 2010/0214284 A1 | 8/2010 | Rieffel et al. | |
| 2010/0214313 A1 | 8/2010 | Herman et al. | |
| 2010/0289804 A1 | 11/2010 | Jackman et al. | |
| 2010/0302249 A1 | 12/2010 | Fowler et al. | |
| 2010/0322358 A1 | 12/2010 | Drumm et al. | |
| 2011/0090236 A1 | 4/2011 | Calsyn et al. | |
| 2011/0106843 A1 | 5/2011 | Pan et al. | |
| 2011/0181606 A1 | 7/2011 | Sumner et al. | |
| 2011/0182479 A1 | 7/2011 | Sese et al. | |
| 2011/0206200 A1 | 8/2011 | Sovio et al. | |
| 2011/0234587 A1 | 9/2011 | Maigret et al. | |
| 2011/0316854 A1 | 12/2011 | Vandrovec | |
| 2012/0095745 A1 | 4/2012 | Le Guevel-Scholtens et al. | |
| 2012/0113125 A1 | 5/2012 | Guerrab et al. | |
| 2012/0166446 A1 | 6/2012 | Bowman et al. | |
| 2012/0280991 A1 | 11/2012 | Maloney et al. | |
| 2012/0280995 A1 | 11/2012 | Anderson | |
| 2012/0284664 A1 | 11/2012 | Zhao | |
| 2013/0063460 A1 | 3/2013 | Marison et al. | |
| 2013/0063472 A1 | 3/2013 | Marison et al. | |
| 2013/0090850 A1 | 4/2013 | Mays | |
| 2013/0120421 A1 | 5/2013 | Maguire | |
| 2013/0120422 A1 | 5/2013 | Rao et al. | |
| 2013/0127891 A1 | 5/2013 | Kim et al. | |
| 2014/0035908 A1 | 2/2014 | Powell et al. | |
| 2014/0059564 A1 | 2/2014 | Vigneras et al. | |
| 2014/0108485 A1 | 4/2014 | Geibel et al. | |
| 2015/0042654 A1 | 2/2015 | Segasby et al. | |

FOREIGN PATENT DOCUMENTS

| | | |
|---|---|---|
| EP | 1990776 A2 | 11/2008 |
| EP | 2187355 A1 | 5/2010 |
| EP | 2779100 A1 | 9/2014 |
| WO | 01/63561 A1 | 8/2001 |
| WO | 2006/094199 A2 | 9/2006 |
| WO | 2007/005739 A2 | 1/2007 |
| WO | 2007/146800 A2 | 12/2007 |
| WO | 2007/146800 A3 | 11/2008 |
| WO | 2010/035141 A2 | 4/2010 |
| WO | 2012/174128 A1 | 12/2012 |
| WO | 2013/036691 A1 | 3/2013 |

OTHER PUBLICATIONS

"Jung (Java Universal Network/Graph) Framework Manual, Filtering", available online at <http://jung.sourceforge.net/doc/manual.html#filter>, retrieved on Apr. 30, 2013, 13 pages.

"WebKit Coordinated Graphics System", available online at <http://trac.webkit.org/wiki/CoordinatedGraphicsSystem>, retrieved on Apr. 30, 2013, 9 pages.

Carstarphen, John, "Lighting Effects in Cinema 4D Animation", available online at <http://www.ehow.com/video_4444919_lighting-effects-cinema-4d-animation.html>, retrieved on Apr. 30, 2013, 2 pages.

Illinois Simulator Lab, "Syzygy Documentation: Programming and Application Frameworks", available online at <http://syzygy.isl.uiuc.edu/szg/doc/Programming.html>, retrieved on Apr. 30, 2013, Dec. 17, 2012, 11 pages.

Lu et al., "Knowledge-Based Digital Media Processing: Generic Object Registration using Multiple Hypotheses Testing in Partition Trees", IEE Proc.-Vis. Image Signal Process, vol. 153, No. 3, Jun. 2006, pp. 323-330.

Oishi et al., "Parallel Alignment of a Large Number of Range Images", Proceedings of the Fourth International Conference on 3-D Digital Imaging and Modeling (3DIM'03), IEEE Computer Society, 2003, 8 pages.

Techfuels, "The Lighting Scene in 3D Animation", available online at <http://www.techfuels.com/applications/9895-lighting-scene-3d-animation.html>, retrieved on Apr. 30, 2013, 3 pages.

(56) References Cited

OTHER PUBLICATIONS

Toon Boom Animation, "Lighting Effects", available online at <http://beta.toonboom.com/home-users/toon-boom-studio/resources/tips-and-tricks/lighting-effects>, retrieved on Apr. 30, 2013, 2 pages.
Van Der Beek, Jelle, "Dependency Graphs in Games", Gamasutra The Art & Business of Making Games, available at <http://www.gamasutra.com/view/feature/131221/dependency_graphs_in_games.php?print=1>, accessed on Apr. 30, 2013, 15 pages.
Ex-Parte Quayle Action received for U.S. Appl. No. 13/831,482, filed Nov. 24, 2014, 7 pages.
International Search Report and Written Opinion received for PCT Patent Application No. PCT/US2014/026792, mailed on Aug. 11, 2014, 7 pages.
International Search Report & Written Opinion received for PCT Patent Application No. PCT/US2014/026799, mailed on Sep. 26, 2014, 11 pages.
Non Final Office Action received for U.S. Appl. No. 13/843,695, mailed on Oct. 22, 2014, 16 pages.
Non Final Office Action received for U.S. Appl. No. 13/844,424, mailed on Oct. 28, 2014, 10 pages.
Barrett et al., "A Monotonic Superclass Linearization for Dylan", Oopsla 96, Jun. 28, 1996, pp. 69-82.
Extended European Search Report received for European Patent Application No. 14160117.9, mailed on May 26, 2014, 7 pages.
Open Inventor Toolkit Tutorial, "Chapter 3. Nodes and Groups and Chapter 4. Cameras and Lights", Available at <http://www-evasion.imag.fr/Membres/Francois.Faure/doc/inventorMentor/sgi_html/ch03.html>, Retrieved on Oct. 18, 2013, 61 pages.
Schmalstieg et al., "Modeling and Rendering of Outdoor Scenes for Distributed Virtual Environments", ACM VRST '97 Lausanne Switzerland, 1997, pp. 209-215.
Sun Microsystems, "Reusing Scene Graphs", Java 3D API Specification, Available at <http://docs.oracle.com/cd/E17802_01/j2se/javase/technologies/desktop/java3d/forDevelopers/j3dguide/SceneGraphSharing.doc.html>, Jun. 1999, pp. 1-11.
Final Office Action received for U.S. Appl. No. 13/831,309, mailed on Jun. 5, 2015, 8 pages.
Invitation to pay additional fees received for PCT Patent Application No. PCT/US2014/026799, mailed on Jul. 25, 2014, 2 pages.
Non Final Office Action received for U.S. Appl. No. 13/843,980, mailed on Feb. 5, 2015, 15 pages.
Non Final Office Action received for U.S. Appl. No. 13/844,016, mailed on Feb. 5, 2015, 23 pages.
Non-Final Office Action received for U.S. Appl. No. 13/831,309, mailed on Feb. 24, 2015, 8 pages.
Final Office Action received for U.S. Appl. No. 13/843,695, mailed on Feb. 23, 2015, 21 pages.
Rossler et al., "Dynamic Shader Generation for Flexible Multi-Volume Visualization", IEEE Pacific Visualisation Symposium, Mar. 2008, pp. 17-24.
Notice of Allowance received for U.S. Appl. No. 13/831,482, mailed on Mar. 4, 2015, 5 pages.
Non-Final Office Action received for U.S. Appl. No. 13/844,497, mailed on Mar. 13, 2015, 21 pages.
Non-Final Office Action received for U.S. Appl. No. 13/844,380, mailed on Apr. 2, 2015, 9 pages.
Final Office Action received for U.S. Appl. No. 13/844,424, mailed on Apr. 7, 2015, 10 pages.
Wernecke, Josie, "The Inventor Mentor: Programming Object-Oriented 3D Graphics with Open Inventor™, Release 2", Addison-Wesley Publishing Company, Chapter 3. Nodes and Groups, 1994.
Non Final Office Action received for U.S. Appl. No. 13/844,113, mailed on Apr. 10, 2015, 10 pages.
Non-Final Office Action received for U.S. Appl. No. 13/831,482, mailed on Apr. 20, 2015, 8 pages.
Notice of Allowance received for U.S. Appl. No. 13/831,309, mailed on Jul. 21, 2015, 14 pages.
Notice of Allowance received for U.S. Appl. No. 13/844,016, mailed on Aug. 21, 2015, 10 pages.
Notice of Allowance received for U.S. Appl. No. 13/844,380, mailed on Jul. 17, 2015, 7 pages.
Extended European Search Report (includes Supplementary European Search Report and Search Opinion) received for European Patent Application No. 14160119.5, mailed on Jun. 30, 2015, 11 pages.
"Robocopy.exe Robust File Copy Utility Version XP010", Microsoft Corporation, 2003, pp. 1-35.
"Open Inventor toolkit Tutorial", Chapter 3. Nodes and Groups and Chapter 4. Cameras and Lights, Available online at <http://www-evasion.imag.fr/Membres/Francois.Faure/doc/inventorMentor/sgi_html/ch03.html>, Retrieved on Oct. 18, 2013, 61 pages.
Bederson et al., "Toolkit Design for Interactive Structured Graphics", IEEE Transactions on Software Engineering, vol. 30, No. 8, Aug. 2004, pp. 535-546.
Qi-Cheng et al., "High-Extensible Scene Graph Framework Based on Component Techniques", Journal of Zhejiang University Science A, vol. 7, No. 7, 2006, pp. 1247-1252.
Dobos et al., "3D Revision Control Framework", Web3D, 2012, pp. 121-129.
Dollner et al., "Object-Oriented 3D Modelling, Animation and Interaction", The Journal of Visualization and Computer Animation, vol. 8, 1997, pp. 33-64.
Tobler, Robert F., "Separating Semantics from Rendering: A Scene Graph Based Architecture for Graphics Applications", Visual Computer, vol. 27, 2011, pp. 687-695.
Adamsen, Mikkel, "ReRendering", available at: http://image.diku.dk/projects/media/mikkel.adamsen.07.pdf, Sep. 24, 2007, 19 pages.
"CGTalk—Viewing Animation in Multiple Viewports", CGSociety, available online at http://forums.cgsociety.org/archive/index.php?t-512252.html, Jun. 28, 2007, 3 pages.
Barzel, Ronen, "Lighting Controls for Computer Cinematography", Journal of Graphics Tools, vol. 2, No. 1, Jan. 1, 1997, 19 pages.
Bittner et al., "Coherent Hierarchical Culling: Hardware Occlusion Queries Made Useful", Eurographics, vol. 23, No. 3, Sep. 2004, 10 pages.
Fisher et al., "Characterizing Structural Relationships in Scenes Using Graph Kernels", ACM, Aug. 7, 2011, pp. 34:1-34:12.
Gould, David, "Complete Maya Programming—An Extensive Guide to Mel and C++API", The Morgan Kaufmann Series in Computer Graphics and Geometric Modelling, 2003, 51 pages.
Pellacini et al., "A User Interface for Interactive Cinematic Shadow Design", ACM, vol. 21. No. 3, Jul. 1, 2002, pp. 563-566.
Ragan-Kelley et al., "The Lightspeed Automatic Interactive Lighting Preview System", ACM Transactions on Graphics, vol. 26, No. 3, Article 25, Jul. 2007, pp. 25.1-25.11.
Watt et al., "LibEE: A Multithreaded Dependency Graph for Character Animation", Proceedings of the Digital Production Symposium on Digipro '12, 2012, pp. 59-66.
Young et al., "Cantata: Visual Programming Environment for the Khoros System", Computer Graphics, ACM, vol. 29, No. 2, May 1, 1995, pp. 22-24.
"Perspective—definition of perspective by the Free Dictionary", available at <www.thefreedictionary.com/perspective>, retrieved on Apr. 22, 2016, 5 pages.
"Play/Stop", available online at http://knowledge.autodesk.com/support/3ds-max/learn-explore/caas/CloudHelp/cloudhelp/2015/ENU/3DSMax/files/GUID-4DC44019-A6BA-40F4-B860-520AD1B16AB7-htm.html, Dec. 17, 2014, 4 pages.
"Perspective I Definition of Perspective by Merriam-Webster", available at merriam-webster.com/dictionary/perspective, 8 pages.
Advisory Action received for U.S. Appl. No. 13/843,695, mailed on Aug. 5, 2015, 2 pages.
Advisory Action received for U.S. Appl. No. 13/843,980, mailed on Jan. 5, 2016, 8 pages.
Advisory Action received for U.S. Appl. No. 13/844,497, mailed on Mar. 16, 2016, 4 pages.
Extended European Search Report (includes Partial European Search Report and Search Opinion) received for European Patent Application No. 14159965.4, mailed on Jul. 20, 2016, 16 pages.

(56) References Cited

OTHER PUBLICATIONS

Extended European Search Report (includes Supplementary European Search Report and Search Opinion) received for European Patent Application No. 14160115.3, mailed on Jul. 28, 2015, 6 pages.
Extended European Search Report received for European Patent Application No. 14159928.2, mailed on Mar. 22, 2016, 15 pages.
Extended European Search Report received for European Patent Application No. 14160002.3, mailed on Dec. 3, 2015, 10 pages.
Extended European Search Report received for European Patent Application No. 14159918.3, mailed on Nov. 12, 2015, 8 pages.
Final Office Action received for U.S. Appl. No. 13/843,695, mailed on Apr. 19, 2016, 9 pages.
Final Office Action received for U.S. Appl. No. 13/843,980 mailed on Sep. 2, 2015, 20 pages.
Final Office Action received for U.S. Appl. No. 13/844,497 mailed on Sep. 28, 2015, 28 pages.
International Preliminary Report on Patentability received for PCT Patent Application No. PCT/US2014/026792 mailed on Sep. 24, 2015, 6 pages.
International Preliminary Report on Patentability received for PCT Patent Application No. PCT/US2014/026799 mailed on Sep. 24, 2015, 8 pages.
Non-Final Office Action received for U.S. Appl. No. 13/843,980, mailed on Mar. 16, 2016, 24 pages.
Non-Final Office Action received for U.S. Appl. No. 13/843,695, mailed on Nov. 23, 2015, 27 pages.
Notice of Allowance received for U.S. Appl. No. 13/844,113, mailed on Jan. 29, 2016, 11 pages.
Notice of Allowance received for U.S. Appl. No. 13/844,113, mailed on May 10, 2016, 10 pages.
Notice of Allowance received for U.S. Appl. No. 13/831,482, mailed on Aug. 31, 2015, 5 pages.
Notice of Allowance received for U.S. Appl. No. 13/844,424, mailed on Nov. 5, 2015, 10 pages.
Notice of Allowance received for U.S. Appl. No. 13/844,016, mailed on Oct. 22, 2015, 2 pages.
Partial European Search Report received for European Patent Application No. 14159965.4, mailed on Apr. 1, 2016, 9 pages.
Partial European Search Report received for European Patent Application No. 14714566.8, mailed on Aug. 1, 2016, 5 pages.
Extended European Search Report received for European Patent Application No. 14160025.4, mailed on Aug. 9, 2016, 6 Pages.
Final Office Action received for U.S. Appl. No. 13/843,980, mailed on Sep. 22, 2016, 22 pages.
Notice of Allowance received for U.S. Appl. No. 13/844,113, mailed on Sep. 8, 2016, 10 pages.

* cited by examiner

RENDER SETUP GRAPH

BACKGROUND

1. Field

The present disclosure relates to computer-generated animation and, more specifically, to rendering a computer-generated animation using a dependency graph.

2. Related Art

A computer-generated animation is typically created by rendering a sequence of images, with each image depicting a computer-generated scene composed of one or more computer-generated objects (e.g., a character, tree, table, chair, etc.). Light sources, materials, textures, and other visual effects may be associated with the computer-generated objects to create realistic lighting effects for the computer-generated scene. Properly implementing these visual effects can involve configuring large amounts of data used by numerous external processes, such as rendering, shading, rasterizing, shadowing calculations, reflection calculations, transmission calculations, and the like. Managing the configuration data and external processes can be difficult due to the large amount of data and large number of processes required to produce a computer-generated animation and the complex dependencies that exist between them.

For example, film production lighting typically requires a lighter to configure tens to thousands of outputs to be used by external processes for each shot in a computer-generated animation. These outputs may depend from multiple inputs, which may in turn depend from other inputs and/or external processes. For example, the lighter may be required to select one or more light sources (e.g., ambient light source, point light source, spotlight, or the like) used to illuminate the computer-generated scene as well as configure surface shaders to simulate the optical properties (e.g., color, texture, specular properties, and the like) of each surface of each computer-generated object in that scene. Thus, the appearance of an object in the scene depends on, among other things, the one or more light sources and the outputs of the external shading processes used to simulate the optical properties of the various surfaces of that object.

As more light sources and objects are added to the scene, the dependencies between the configuration data and the external processes become exceedingly complex. Moreover, complex assignments of lighting configurations may be used such that some lighting configurations are assigned on an object-by-object basis, while others are assigned to groups of objects identified by a shared attribute. For example, a spotlight may be associated with only the main character in the foreground of the scene, causing the spotlight to illuminate the main character and not the other objects in the scene. The scene may also include an ambient light associated with all objects in the scene. This approach provides the animator or lighter with more flexibility when configuring the visual effects in a scene, but may result in increased complexity for the lighter since traditional lighting work-flows require the lighter to commit the intricate data dependencies between the external processes to memory. Additionally, traditional lighting work-flows require the lighter to explicitly modify the lighting configurations as objects in a scene are edited, added, or removed, creating a substantial amount of work for the lighter.

It is therefore desirable to create a system for configuring and managing the configuration data and external processes used to render a computer-generated animation.

SUMMARY

Processes for rendering an image using a dependency graph are described. One example process may include accessing a dependency graph, the dependency graph comprising a plurality of interconnected nodes; accessing a set of animation objects; selecting a subset of the set of animation objects; selecting a visual effect for the subset of the set of animation objects; and rendering an image based on the subset of the set of animation objects and the selected visual effect. The plurality of interconnected nodes may include a first node representative of the set of animation objects; a second node comprising an object attribute or configuration attribute for selecting the subset of the set of animation objects; a third node comprising the visual effect to be selected for the subset of the set of animation objects; and a fourth node comprising an instruction to render the image based on the subset of the set of animation objects and the selected visual effect.

In some examples, selecting the subset of the set of animation objects may include selecting animation objects that comprise the object attribute or the configuration attribute from a set of animation objects received at an input of the second node. The object attribute or configuration attribute comprises one or more of an object name, an object type, a geometry name, a part name, a material, or a proximity characteristic.

In some examples, the dependency graph may further include a fifth node comprising an instruction to perform one or more of a rendering process, translucency process, shading process, or rasterizing process. Rendering the image may include rendering the image using a result from the one or more of the rendering process, translucency process, shading process, or rasterizing process.

Systems and computer-readable storage media for rendering an image using a dependency graph are also described.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

Figure 1:
FIG. 1 illustrates an exemplary rendered image that may be generated using a render setup graph according to various embodiments.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

For descriptive purposes, throughout this disclosure, software, software modules, software objects, and the like may be described as performing various functions. One of ordinary skill in the art, however, will recognize that software may not actively perform any function and instead may include instructions that are executable on a computer processor. As such, although software may be described herein as performing a function, it should be appreciated that a computer processor or other computing device may typically perform those functions attributed herein to software modules or objects by executing computer instructions provided by the software modules or objects.

As mentioned above, a computer-generated animation is typically created by rendering a sequence of images, each image depicting a computer-generated scene composed of one or more computer-generated objects. Light sources, materials, textures, and other visual effects may be associated with the computer-generated objects to create a realistic visual appearance for the computer-generated scene. For purposes of this discussion, a computer-generated scene generally refers to the three-dimensional space that may be filmed using a virtual camera, and may also be referred to generically as a scene.

Various embodiments are described below relating to a render setup graph for configuring and managing lighting configuration data as well as external processes used to render a computer-generated image. The render setup graph may include a dependency graph having nodes interconnected by edges along which objects and object configuration data may be passed between nodes. For example, the output of a node may include one or more objects and associated configuration data (or identifiers for one or more objects and associated configuration data). The input of a node may include a reference to one or more outputs of another node through which the node may receive the object and object configuration data. In this way, the nodes may be used to provide a source of objects and object configuration data, configure visual effects of an object, partition a set of objects, call external processes, perform data routing functions within the graph, and the like. In this way, the render setup graph may advantageously be used to organize configuration data and execution of processes for rendering an image.

FIG. 1 depicts an exemplary computer-generated image that may be rendered using a render setup graph according to various embodiments. Notably, FIG. 1 depicts lighting effects caused by light sources being reflected and blocked by portions of two animated characters. To create such an image, a lighter typically configures light sources, shaders, and the like to produce the desired lighting effect. As previously discussed, traditional lighting work-flows require lighters to commit these lighting configurations to memory, making the lighting process a difficult and burdensome task.

Figure 2:
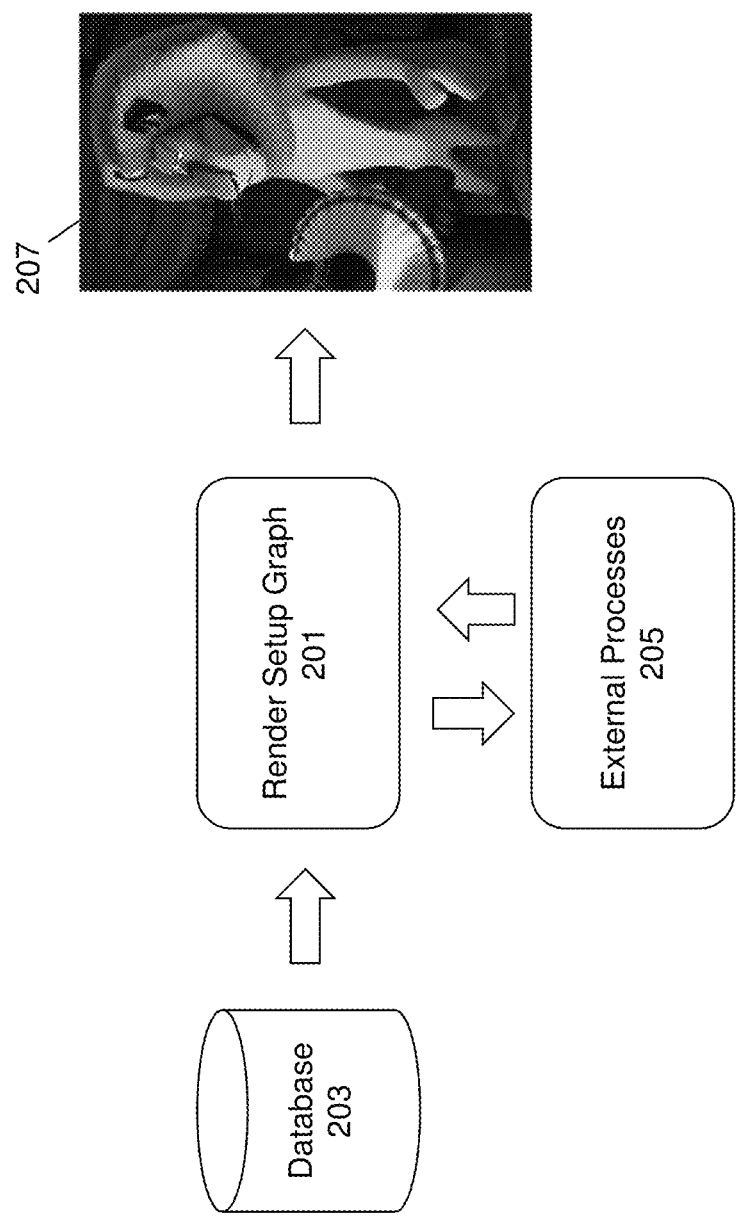
FIG. 2 illustrates the operation of an exemplary render setup graph used to render an image according to various embodiments.

FIG. 2 illustrates the operation of an exemplary render setup graph 201 that can be used to configure and manage lighting configuration data as well as external processes used to render the computer-generated image 207 of FIG. 1. Render setup graph 201 may receive data, such as animation objects, object configuration data, and the like from database 203, which may include a centralized or decentralized computer-storage database made up of one or more local and/or remote computer-storage databases that can be accessed by one or more users. Using a centralized storage may improve storage efficiency and help ensure that the rendering of a computer-generated animation is performed using a common version of the computer-generated objects.

The object data received from the database 203 may include data in any format that represents the set of objects (e.g., characters, plants, buildings, etc.) that may be used to render an image. For example, the object data may include surface and/or volumetric representations of the objects, identification of parts that make up the objects, and the like. In some examples, the set of objects may include objects that are to be displayed within an image as well as those contained in the database that are not displayed within the image.

The object configuration data may include visual properties, such as materials, textures, and the like that may be associated with the surfaces of the parts of the objects. The object configuration data may also include any number of "looks" that have been defined for the object. The looks may include specific configurations of visual properties that have been assigned to the surfaces of the object. For example, a chair object may have a first look that assigns a pine wood material to each piece of the chair and a second look that assigns a maple wood material to each piece of the chair. Any number of looks may be defined for each object and may be included within the object configuration data provided by the database 203. Thus, in some examples, the data provided by database 203 may include a set of configured computer-generated objects, where each member of the set represents an object configured to have a particular look.

Render setup graph 201 may include a dependency graph having nodes interconnected by edges along which objects and object configuration data may be passed between nodes. The nodes may be used to provide a source of objects and object configuration data, configure visual effects of an object, partition a set of objects, call external processes 205, perform data routing functions within the graph, and the like. Render setup graph 201 may provide object data, object configuration data, and any other required data to external processes 205. The results of external processes 205 may be returned to render setup graph 201. The evaluation of render setup graph 201 and the execution of associated external processes 205 may produce a computer-generated image 207 like that shown in FIG. 1.

Figure 3:
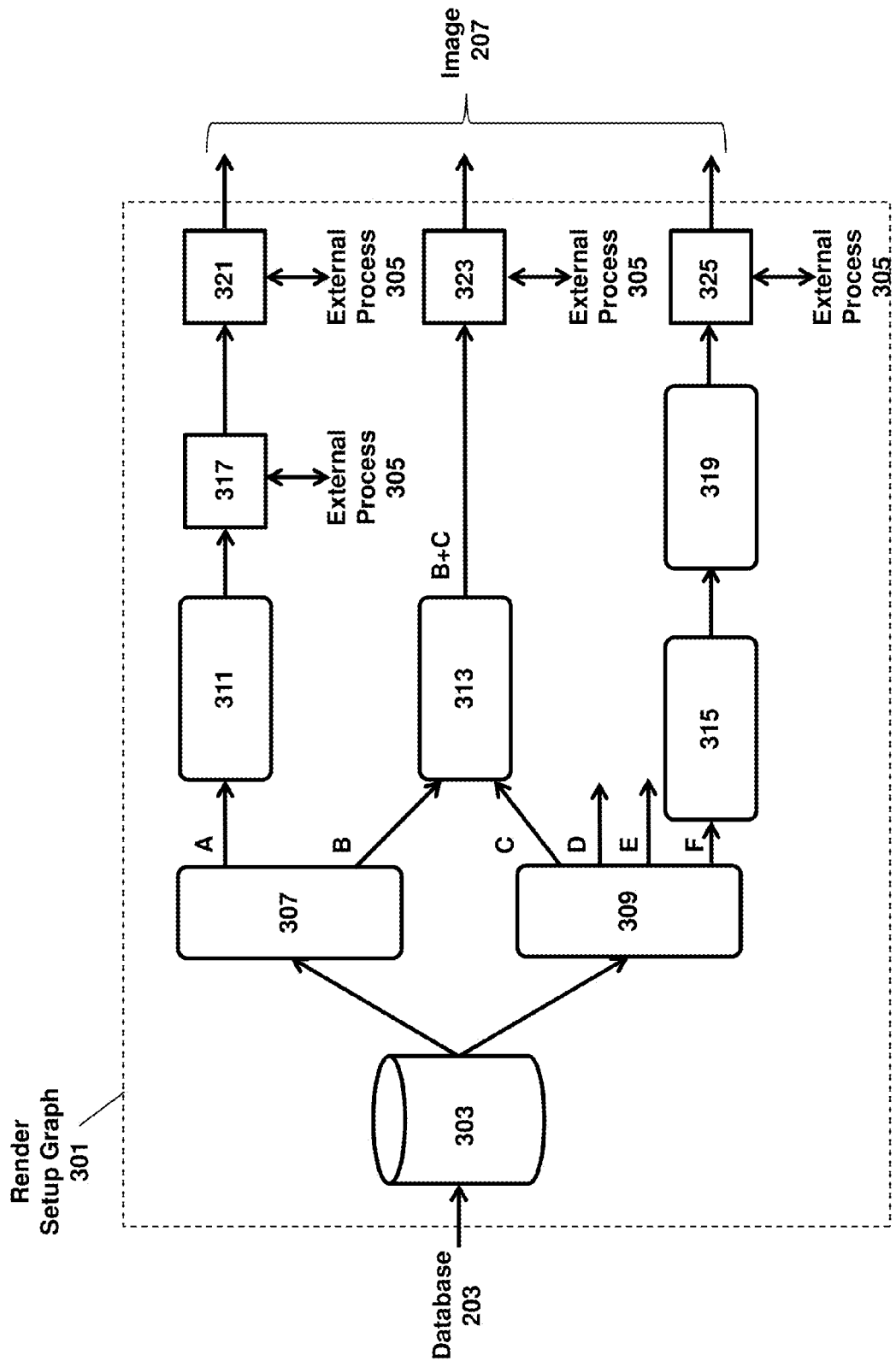
FIG. 3 illustrates an exemplary render setup graph according to various embodiments.

FIG. 3 illustrates a more detailed view of a visual representation of an exemplary render setup graph 301, which is an example graph that may be used as render setup graph 201 in FIG. 2. Generally, render setup graph 301 may receive objects and object configuration data as input from a database (e.g., database 203) and may call external processes 305 to produce a computer-generated image (e.g., image 207). As described in detail below, render setup graph 301 may be displayed on a computer display and manipulated using a graphical user interface and computer I/O hardware. In this way, render setup graph 301 may be generally configurable by an animator, lighter, or other user and may be used to configure and manage lighting configuration data as well as external processes used to render a computer-generated image.

As shown in FIG. 3, render setup graph 301 may include a dependency graph having one or more nodes (e.g., nodes 303, 307, 309, 311, 313, 315, 317, 319, 321, 323, and 325) interconnected by edges. The nodes may perform various functions depending on the node type. For example, nodes may represent a source of data, configure visual effects of an object, partition a set of objects, call external processes, perform data routing functions within the graph, and the like. The data output by a node may be conveyed to downstream nodes along edges connecting the nodes.

Render setup graph 301 may include various types of nodes to perform any desired function. One example node type that may be included within render setup graph 301 is an object source node (e.g., node 303) representative of a set of configured computer-generated objects (e.g., objects and their associated object configuration data) that are to be used by render setup graph 301 and that may be provided by a local or remote database similar or identical to database 203, discussed above. In some examples, the set of configured computer-generated objects represented by the source node can be assigned by the user. For example, to render a particular image, the user may select a render setup graph 301 and a set of objects to be operated on using the render setup graph 301. In this way, the render setup graph 301 is not constrained to a particular set of objects and can be used to render any desired image.

Alternatively, the object source node may include reference information that identifies the objects to be used by render setup graph 301. In some examples, the objects may be referenced by an identification of a storage location containing those objects. For example, the object source node may include a reference to one or more local or remote databases (e.g., database 203) that contain the objects to be used by render setup graph 301. In this way, the objects to be used by render setup graph 301 may be added, deleted, or modified at the source database(s) and may be used by the render setup graph 301 without having to modify render setup graph 301 to specifically reference the newly added or modified objects. In other examples, the object source node may include unique identifiers that individually reference the objects to be used by render setup graph 301. For example, if each object is given a unique name or identifier, the object source node may include a list of object names or unique identifiers to define the set of objects to be used by render setup graph 301. The object source node may output the set of referenced objects (and associated object configuration data) along one or more edges to one or more connected nodes. For example, object source node 303 may provide the set of objects and associated object configuration data contained in database 203 to nodes 307 and 309.

Another type of node that may be included within render setup graph 301 is an organizer node (e.g., nodes 307 and 309) that may be used to partition a set of objects (and associated object configuration data) received at the input of the organizer node. The organizer node may be configured to partition received objects based on any one or more attributes of the objects or associated configuration data, such as object name, object type, geometry name, part name, material, proximity characteristics (e.g., objects within camera frustum, distance from object/camera, existence within a region, or the like) with a time-based limitation (e.g., a time value or range that the position of the object is evaluated), screen projection with a time-based limitation (e.g., a time value or range that the position of the object is evaluated), or the like. For example, an organizer node may include partition criterion to partition all objects (and associated object configuration data) having an object type of "chair." Thus, in this example, the organizer node may evaluate metadata associated with the set of objects received at the input of the organizer node and may generate a subset of objects containing all chair-type objects that were received by the organizer node. For the time-based limitations, the organizer node may be configured such that the time-based criterion is met if the criterion is met for the entire time range or if the criterion is met at any time within the range.

In some examples, the organizer node may generate two outputs for each partition criterion defined for that node. The first output may include the subset of objects (which may include zero, some, or all of the received set of objects) that satisfy the partition criterion, while the second output may include the subset of objects that do not satisfy the partition criterion. For instance, continuing with the example provided above, organizer node 307 is coupled to receive the set of objects contained in database 203 from object source node 303. Organizer node 307 may be configured to include one partition criterion to partition all objects (and associated object configuration data) having an object type of "chair." Thus, organizer node 307 may evaluate metadata associated with the set of objects received at the input of organizer node 307 and output the set of chair-type objects at output A. Organizer node 307 may further output the set of remaining objects (e.g., non-chair objects) and associated object configuration data at output B.

While organizer node 307 is shown having two outputs, it should be appreciated that organizer nodes may include additional outputs for any additional partition criteria specified for that node. Additionally, it should be appreciated that the partition criteria may be hierarchical, meaning that one partition criterion may be used to partition the result of another partition criterion. For example, organizer node 309 may be configured to include one partition criterion to partition objects having an object type of "plant" and a second partition criterion to partition plants located within a defined region of a scene. Thus, organizer node 309 may output all plant objects (and associated configuration data) received at the input of organizer node 309 at output C, all non-plant objects (and associated object configuration data) at output D, all plant objects (and associated object configuration data) located within the defined region of the scene at output E, and all plant objects (and associated object configuration data) that are not located within the defined region of the scene at output F. Each of the outputs of organizer nodes 307 and 309 may be connected to any number of downstream nodes by edges and may pass their respective subsets of objects (and associated object configuration data) along these edges.

Partitioning objects based on object attributes and object configuration data advantageously allows an animator, lighter, or other user to select objects having a desired characteristic, without requiring the user to individually identify the selected objects. This obviates the need to modify the render setup graph 301 when the objects in the set of input objects are modified, added, or deleted. For example, if an additional chair object is added to the scene, the organizer node 307 may identify this newly added chair object and output it along with the previously defined chair objects at output A without any additional input from the user.

Another type of node that may be included within render setup graph 301 is a merge node (e.g., node 313) that may be used to output the aggregate of all inputs received by the merge node. For example, merge node 313 may receive output B from organizer node 307 and output C from organizer node 309. Merge node 313 may combine these sets of objects and may output the set of objects that includes all of B and all of C. In some examples, duplicate objects between the inputs of the merge node may be discarded such that only one of each object exists at the output. In other examples, duplicate objects between the inputs of the merge node may not be discarded such that the output of the merge node may include multiple instances of the same object.

Another type of node that may be included within render setup graph 301 is a look selector node that may be used to select a particular "look" for an object. As mentioned above, the object configuration data passed between nodes may include looks that were defined for the associated object. For example, a chair object may have a first look that assigns a pine wood appearance to each piece of the chair and a second look that assigns a maple wood appearance to each piece of the chair. The look selector node may be used to select a look for the one or more objects received by the node and may output the one or more objects configured to have the selected look.

For example, node 311 may be a look selector node and may be configured to select a high-quality look for the objects received from output A of organizer node 307. This may be used, for example, because the objects received from output A of organizer node 307 appear in the foreground of the scene, and thus should appear with a higher level of detail. Look selector node 311 may then output the objects received from output A of organizer node 307 with the high-quality look selected.

Another type of node that may be included within render setup graph 301 is a light node that may be assigned to illuminate one or more objects and which may be configured such that some other set of objects casts shadows due to that light. The light node may correspond to one or more light sources, such as ambient light sources, point light sources, spotlights, and the like. The light node may be configured to cast shadows by the object(s) received as its input. In an organizer node, a light can also be assigned to illuminate one or more objects. These shadow casting objects may then cast shadows within a scene when these assigned light sources fall on them. For example, node 315 may be a light node configured to cast a shadow due to a point light source falling on the objects received from output F of organizer node 309. As a result, the objects received from output F of the organizer node 309 may cast shadows from the point light source associated with node 315 when the objects are rendered. To assign light sources to illuminate an object, an organizer node may be used. In particular, the light source may be associated with the organizer node and may be assigned to illuminate the objects of one or more of the outputs of the organizer node.

Another type of node that may be included within render setup graph 301 is a material node that may be used to assign a material to an object. The material node may assign a material to the surface of an entire object or only a portion of the object. For example, a material node may be used to assign a material type of brass to a doorknob of a door or may be used to assign a material type of oak to an entire chair. Alternatively, the material nodes may simply represent a material and may be linked to an organizer node. In these examples, the organizer node may be further configured to assign the material associated with the linked material node to one or more of the outputs of the organizer node.

Another type of node that may be included within render setup graph 301 is a map node that may be used with light and material nodes. The map node may specify a texture to be used by the light or material, but is not directly assigned as part of the configuration. Instead, the texture is applied to the light or material by virtue of the map node being linked with the node associated with the light or material.

Another type of node that may be included within render setup graph 301 is a generic node that may be used to encapsulate a process that has not been predefined. These nodes may be associated with a command manually entered by the user to provide flexibility to the graph by allowing users to perform functions that were not explicitly provided by the graph.

Another type of node that may be included within render setup graph 301 is a pass node (e.g., 317, 321, 323, and 325) that may be used to call external processes, such as rendering processes, translucency processes, shading processes, rasterizing processes, shadowing processes, reflection processes, transmission processes, and the like. Pass nodes may include an instruction to perform an external process using objects and object configuration data received by the pass node. For example, the pass nodes may include a reference to the external processes to be performed and may pass the data received by the pass node to the external process. The pass node may receive the output of the external process after the process is executed, and may, in turn, output that result to other nodes within the render setup graph 301 or may output the result of the external process as an output of the render setup graph 301.

For example, node 317 may be a translucency pass node configured to call an external translucency process 305. As such, node 317 may pass the objects (and associated object configuration data) to the external translucency process 305 and may receive the result of the execution of that process. Node 317 may then output the result of the external translucency process 305 to another pass node 321 within render setup graph 301. This pass node 321 may be, for example, a shade pass node configured to call an external shading process 305. As such, node 321 may pass the output of the translucency pass node 317 to the external shading process 305 and may receive the result of the execution of that process. The result of the shading process 305 may then be output by the render setup graph 301 as part of image 207. Similarly, the outputs of pass nodes 323 and 325 may call their respective external processes 205 and may output by the render setup graph 301 as part of image 207.

While specific types of nodes are provided above, it should be appreciated that render setup graph 301 may include other types of nodes, such as splitter nodes, other routing nodes, for-loop nodes, group nodes (representing two or more nodes to avoid screen clutter), and the like. These other nodes can be combined with those discussed above to allow an animator, lighter, or other user to configure, document, and visualize the processes to be performed and the dependencies of these processes on other processes and configuration data. Moreover, while a specific arrangement of a render setup graph is provided above, it should be appreciated that a render setup graph may include additional or fewer nodes arranged in any configuration as appropriate to generate a desired image or animation.

Using a render setup graph similar or identical to that described above advantageously allows the animator or lighter to abstractly define the objects to be used, configure visual effects of these objects (e.g., lighting effects), quickly identify dirty data that should be updated, and define the flow of processes to be performed in a manner that is independent of the objects being input into the graph. Additionally, the render setup graph provides the animator, lighter, or other user with the ability to define and configure rendering passes without having to work on the entire scene. The render setup graph may also allow the animator, lighter, or other user to work with a simplified version of the scene that may omit resource intensive visual effects that are used in the final production rendering pass.

Figure 4:
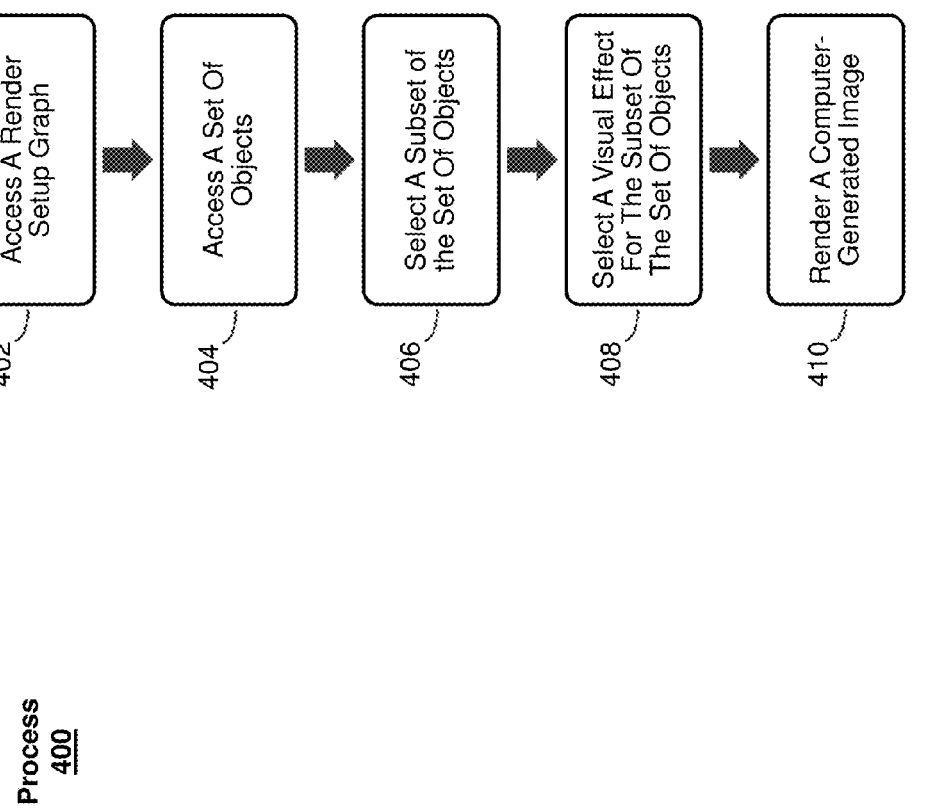
FIG. 4 illustrates an exemplary process for rendering an image using a render setup graph according to various embodiments.

FIG. 4 illustrates an exemplary process 400 for rendering an image using a render setup graph similar or identical to graph 301, discussed above. At block 402, a render setup graph may be accessed. For example, a processor may access a local or remote database containing a render setup graph (e.g., a graph similar or identical to render setup graph 201 or 301) that was generated to render a particular image or animation. The render setup graph may include nodes interconnected by edges that define the objects to be used in the rendering process, the configurations for the visual effects of those objects, and the external processes to be executed on those objects.

At block 404, a set of animation objects may be accessed. Object configuration data that are associated with the objects, such as the visual properties and looks for an object, may also be accessed. In some examples, the set of objects may be defined by the user. For example, to render a particular image, the user may select the render setup graph to be accessed at block 402 and a set of objects to be operated on using that render setup graph. In this way, the render setup graph is not constrained to a particular set of objects and can be used to render any desired image. The user-selected objects may be accessed from a database similar or identical to database 203 and provided to the render setup graph at one or more object source nodes similar or identical to object source node 303.

Alternatively, the set of objects may be defined by the render setup graph. The render setup graph may define the objects to be accessed using an object source node similar or identical to object source node 303 discussed above. In some examples, the object source node may include one or more references that define the set of objects abstractly, for example, by identifying one or more storage locations of the objects. In this way, objects to be used by the render setup graph may be modified, added, or deleted without having to modify the render setup graph. In other examples, the object source node may include one or more references that explicitly define the objects to be used by individually identifying the objects (e.g., by using a unique identifier). Depending on the way the objects are defined by the object source node, a processor may access the objects by querying a local or remote database using the object identifiers or the location identifiers. For example, if render setup graph 301 was accessed at block 402, the set of objects and associated object configuration data to be accessed at block 404 may be defined by object source node 303. In some examples, object source node 303 may define the set of objects to be used by render setup graph 301 abstractly by identifying database 203 as the source of the objects. Thus, at block 404, the objects and associated object configuration data may be accessed from database 203.

At block 406, a subset of the set of objects accessed at block 404 may be selected based on the render setup graph. To select or define the subsets to be configured, organizer nodes similar or identical to organizer nodes 307 and 309 may be used to selectively partition subsets of objects based on any one or more attributes of the objects or associated configuration data, such as object name, object type, geometry name, part name, material, proximity characteristics (e.g., objects within camera frustum, distance from object/camera, existence within a region, or the like) with a time-based limitation, screen projection with a time-based limitation, or the like.

For example, continuing with the example provided above, render setup graph 301 may include organizer node 307 to define a subset of objects received by object source node 303 by partitioning objects having an object type of "chair." As a result, a subset of objects containing chair-type objects may be output at output A of organizer node 307.

At block 408, visual effects of subsets of the set of objects selected at block 406 may be selected based on the render setup graph. The visual effects may include any type of visual effect, such as a look, associated light source, texture, material, or the like. Nodes, such as light nodes, material nodes, look selector nodes, and map nodes may be used to select visual effects (e.g., light sources, material properties, looks, and textures) that are to be associated with the subsets of objects. In particular, a set of objects received by one of the light nodes, material nodes, look selector nodes, map nodes, and the like, may be assigned a visual effect as defined by that node. In other examples, the light nodes and material nodes may simply be represent a light source or material, respectively, and may be linked to an organizer node. In these examples, the organizer nodes may be further configured to assign materials or light sources associated with linked nodes to the objects. As a result, any subsequent process performed on those objects may be performed using the selected visual effect(s).

For example, continuing with the example provided above, render setup graph 301 may include organizer node 307 that outputs the subset of objects containing chair-type objects at output A of organizer node 307. This subset of chair-type objects may be received by node 311, which may be a look selector node configured to select a high-quality look for the objects received at the input of the node. As a result, all processes performed on the chair-type objects output by look selector node 311 may be performed using the high-quality look (assuming that there are no intervening look selector nodes that may change the selected look).

At block 410, a computer-generated image may be rendered based on the render setup graph. Rendering the image may include performing one or more external processes on the subset of objects using the selected visual effect(s) based on the render setup graph. The external processes may include any process, such as rendering, shading, rasterizing, shadowing calculation, reflection calculation, transmission calculation, or the like that the animator, lighter, or other user may want to perform on the objects used by the render setup graph. In some examples, the render setup graph may include pass nodes similar or identical to pass nodes 317, 321, 323, and 325 that may include references to the external processes to be performed. A processor may execute the processes referenced by these pass nodes using the objects and associated configuration data received by these pass nodes. A processor may then aggregate the outputs of some or all of the pass nodes to produce a computer-generated image of a scene.

For example, continuing with the example provided above, render setup graph 301 may reference an external translucency process using pass node 317. Thus, the referenced translucency process may be performed on the subset of chair-type objects partitioned by organizer node 307 using the high-quality look selected based on look selector node 311. Render setup graph 301 further includes a pass node 321, which may reference an external shading process. As a result, the referenced shading process may be performed on the result of the translucency process performed on the subset of chair-type objects using a high-quality look. The result may be a high-quality shaded representation of the subset of chair-type objects partitioned by organizer node 307. This data may be combined with the outputs of pass nodes 323 and 325, which may output a representation of a character in the scene and the background of the scene, respectively. The processor may combine these outputs to render an image of shaded chairs, a character, and a background.

Figure 5:
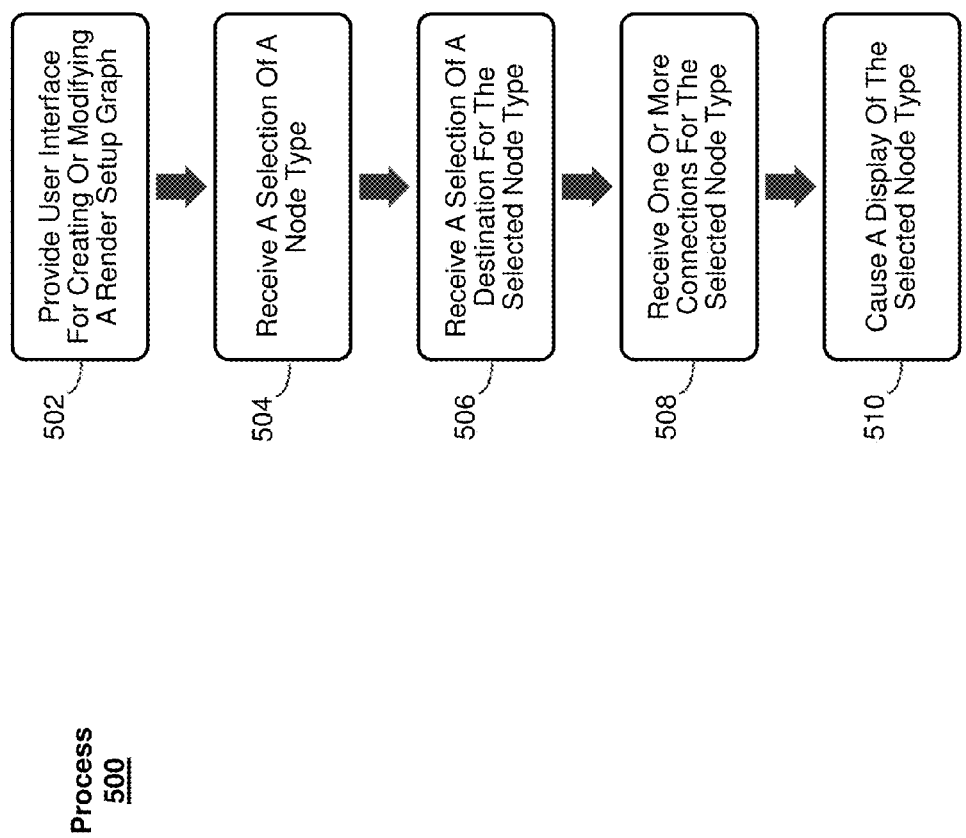
FIG. 5 illustrates an exemplary process for generating a render setup graph according to various embodiments.
Figure 6:
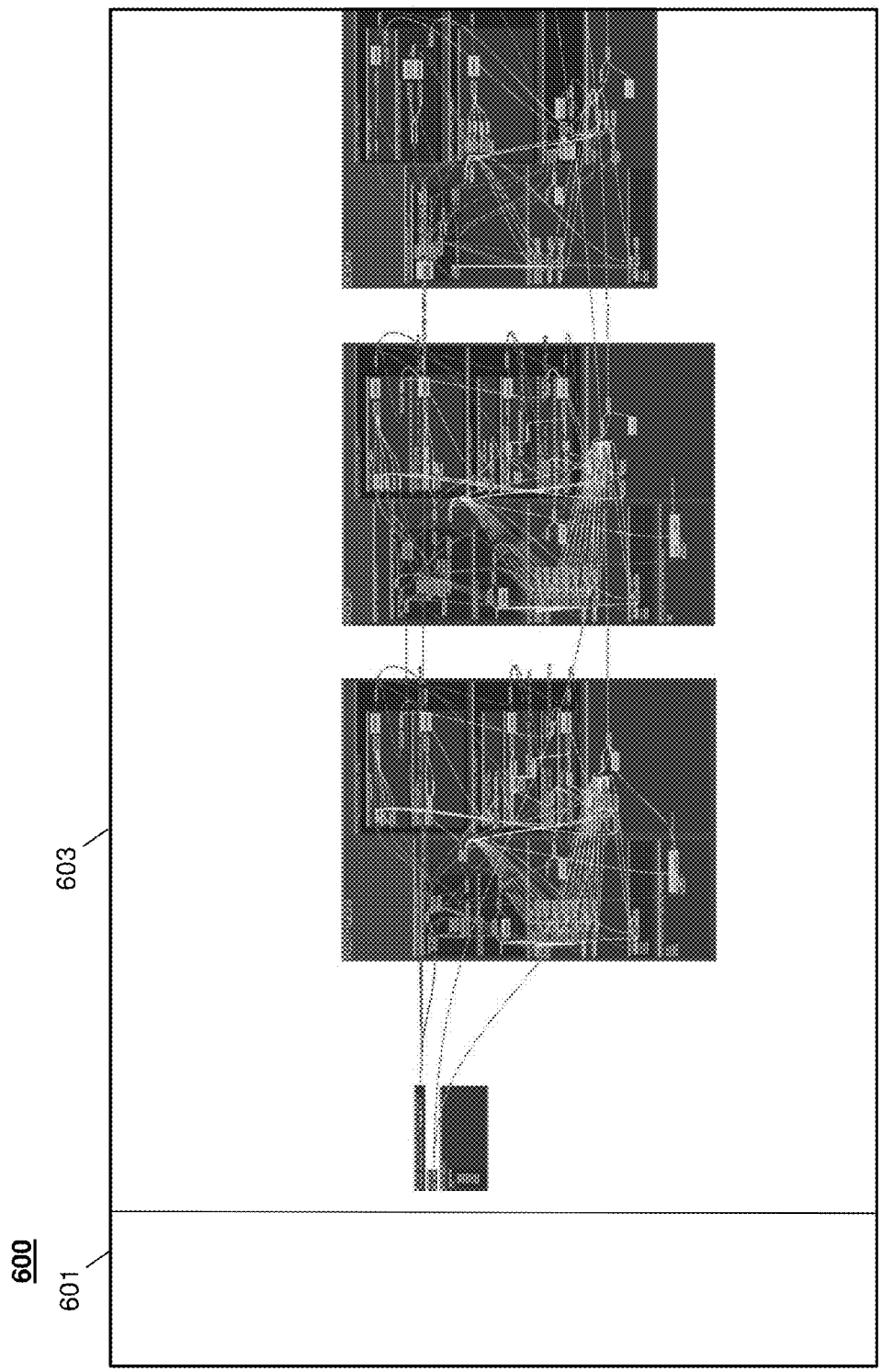
FIG. 6 illustrates an exemplary interface that may be used to generate and modify a render setup graph according to various embodiments.
Figure 7:
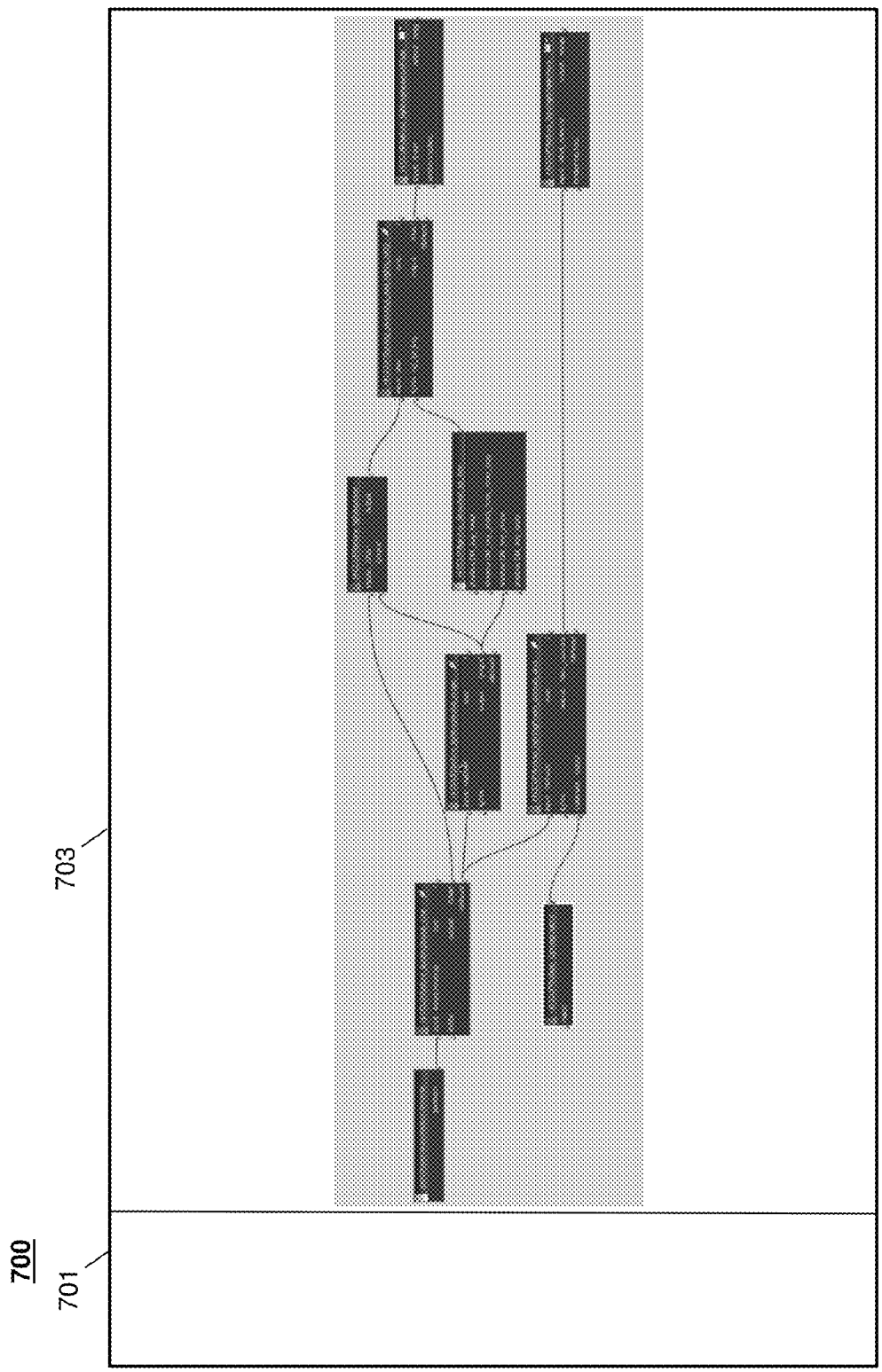
FIG. 7 illustrates an exemplary interface that may be used to generate and modify a render setup graph according to various embodiments.

FIG. 5 illustrates an exemplary process 500 that may be used to generate a render setup graph according to various embodiments. At block 502, a user interface for generating or modifying a render setup graph may be caused to be displayed. For example, a processor may cause a user interface similar or identical to interfaces 600 and 700 shown in FIGS. 6 and 7, respectively, to be displayed on a monitor or other display device. In some examples, the user interface 600/700 may include a first portion 601/701 for displaying a visual representation of the nodes and edges of the render setup graph. The user interface may further include a second portion 603/703 having visual representations of one or more node types that may be included within the first portion 601/701 of the display. The visual representations of the node types may include text and/or graphics representing the various node types, such as organizer nodes, pass nodes, merge nodes, light nodes, material nodes, map nodes, look selector nodes, object source nodes, generic nodes, or the like. The user interface may include any known means for selecting an object, such as a pull-down menu, drag-and-drop icons, or the like.

At block 504, a selection of a node type may be received. The selection may include an identification of the selected node type. The selection may be received by a processor in response to a selection made by a user in the user interface provided at block 502. The selection may be made using any known means for selecting an object, such as a pull-down menu, drag-and-drop icons, or the like.

At block 506, a selection of a destination of the node type selected at block 504 may be received. In some examples, the destination may include a position within the first portion 601/701 of the display at which the selected node type should be displayed. The user may make this selection using any known selection means, such as clicking on the destination after selecting the node type, dragging the selected node type to the destination, entering coordinates of the destination, or the like. In some examples, a processor may receive the selected destination and may cause a visual representation of the selected node type to be displayed at a position within the user interface corresponding to the selected destination.

At block 508, one or more connections for the selected node type may be received. The connections may indicate one or more sources of an input to the selected node type or one or more destinations for an output of the selected node type. In some examples, the connections may be selected by a user by selecting an output of one node and an input of another node.

At block 510, a display of a visual representation of the node type selected at block 504 may be displayed at a position in the display corresponding to the destination selected at block 506 and with connections received at block 508. For example, a processor may cause a visual representation of a node connected by lines to one or more other nodes within the first portion 601/701 of the user interface 600/700 shown in FIGS. 6 and 7. The render setup graph may also be stored for subsequent use to render an image using process 400, described above.

Figure 8:
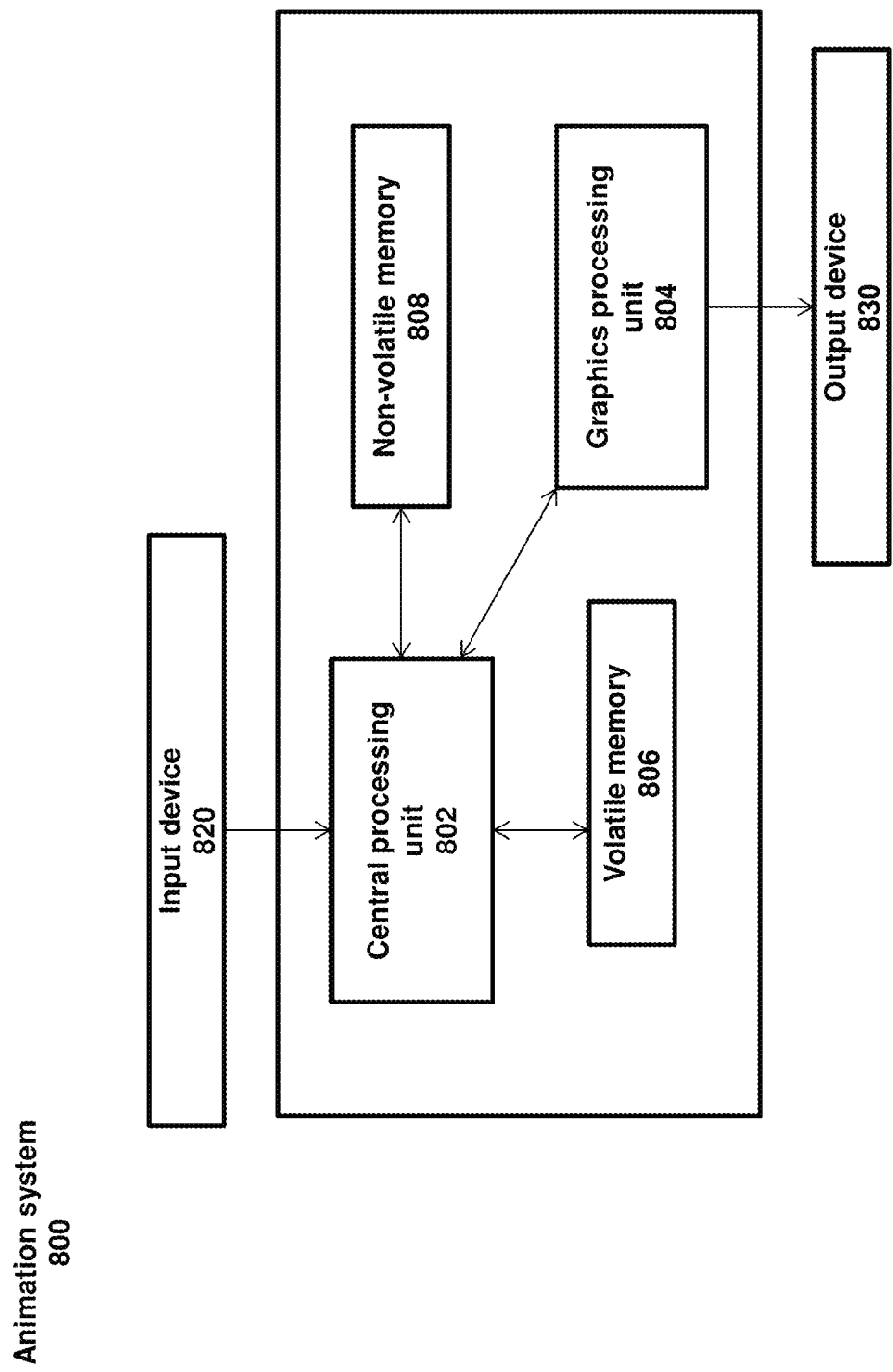
FIG. 8 illustrates an exemplary computing system.

FIG. 8 illustrates an exemplary animation system 800 that can be used to implement the render setup graph discussed above. The render setup graph can be implemented, for example, in either hardware or in software stored on a non-transitory computer-readable storage medium. The system can be configured to generate, modify, and evaluate the render setup graph to configure and manage lighting configuration data as well as external processes used to render a computer-generated image. The system can be further configured to receive input from a user and to display graphics, an image, or scene of an animation based on the render setup graph.

The animation system 800 can be configured to receive user input from an input device 820. The input device 820 can be any device that receives input from the user and transmits it to the animation system 800. For example, the input device 820 can be a keyboard, a mouse, a tablet, a stylus, or the like. Those skilled in the art will recognize that other types of input devices can also be used.

The animation system 800 can be configured to output graphics, images, or animation to a display device 830. The display device 830 can include any device that receives data from the animation system and presents the data to the user. For example, the display device may include a liquid crystal display, a set of light-emitting diodes, a projector, or the like. Those skilled in the art will recognize that other types of output devices can also be used.

The animation system 800 may further include a central processing unit 802. The central processing unit may include one or more processing cores. The central processing unit 802 may be coupled to and able to communicate with the input device 820. Although the animation system 800 is illustrated with one central processing unit 802, the animation system 800 may include multiple processing units. The animation system 800 may also include a graphics processing unit 804. The graphics processing unit 804 may be dedicated to processing graphics-related data. The graphics processing unit 804 may include a single processing core or multiple processing cores. Although the animation system 800 is illustrated with one graphics processing unit 804, the animation system 800 may include a plurality of graphics processing units. The central processing unit 802 and/or the graphics processing unit 804 may be coupled to and able to communicate data to the output device 830.

In one example, the animation system 800 may include one or more processors and instructions stored in a non-transitory computer-readable storage medium, such as a memory or storage device, that when executed by the one or more processors, perform animation rendering using a render setup graph, as described above. In the context of the embodiments described herein, a "non-transitory computer-readable storage medium" can be any medium that can contain or store the program for use by or in connection with the instruction execution system, apparatus, or device. The non-transitory computer-readable storage medium can include, but is not limited to, an electronic, magnetic, optical, electromagnetic, infrared, or semiconductor system, apparatus- or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The animation system 800 may include volatile memory 806, which is a non-transitory computer-readable storage medium, in communication with the central processing unit 802. The volatile memory 806 may include, for example, random access memory, such as dynamic random access memory or static random access memory, or any other type of volatile memory. The volatile memory 806 may be used to store data or instructions during the operation of the animation system 800. Those skilled in the art will recognize that other types of volatile memory can also be used.

The animation system 800 may also include non-volatile memory 808, which is a non-transitory computer-readable storage medium, in communication with the central processing unit 802. The non-volatile memory 808 may include flash memory, hard disks, magnetic storage devices, read-only memory, or the like. The non-volatile memory 808 may be used to store animation data, render setup graph data, computer instructions, or any other information. Those skilled in the art will recognize that other types of non-volatile memory can also be used.

The animation system 800 is not limited to the devices, configurations, and functionalities described above. For example, although a single volatile memory 806, non-volatile memory 808, central processing unit 802, graphics processing unit 804, input device 820, and output device 830 are illustrated, a plurality of any of these devices can be implemented internal or external to the animation system 800. In addition, the animation system 800 may include a network access device for accessing information on a network, such as an internal network or the Internet. Those skilled in the art will recognize that other configurations of the animation system 800 can be used.

Various exemplary embodiments are described herein. Reference is made to these examples in a non-limiting sense. They are provided to more broadly illustrate applicable aspects of the disclosed technology. Various changes may be made and equivalents may be substituted without departing from the true spirit and scope of the various embodiments. In addition, many modifications may be made to adapt a particular situation, material, composition of matter, process, process act(s), or step(s) to the objective(s), spirit, or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments.

What is claimed is:

1. A computer-implemented method for rendering an image using a dependency graph, the method comprising:
    accessing a dependency graph, the dependency graph comprising a plurality of interconnected nodes;
    accessing a set of animation objects, the set of animation objects stored at a first node of the plurality of interconnected nodes;
    accessing a partition criterion stored at a second node of the plurality of interconnected nodes;
    subsequent to accessing the partition criterion, selecting, based on the partition criterion, a subset of the set of animation objects;
    accessing the subset of the set of animation objects;
    selecting a visual effect, the visual effect stored at a third node of the plurality of interconnected nodes;
    accessing an instruction to render the image, the instruction to render the image stored at a fourth node of the plurality of interconnected nodes;
    subsequent to accessing the visual effect stored at the third node and in response to accessing the instruction to render the image, rendering the image based on the subset of the set of animation objects and the selected visual effect.

2. The method of claim 1, wherein selecting, based on the partition criterion, the subset of the set of animation objects comprises selecting animation objects that satisfy the partition criterion from the set of animation objects and not selecting, from the set of animation objects, animation objects that do not satisfy the partition criterion, the set of animation objects received at an input of the second node.

3. The method of claim 1, wherein the partition criterion comprises one or more of an object configuration, object attribute, object name, an object type, a geometry name, a part name, a material, or a proximity characteristic.

4. The method of claim 1, wherein the dependency graph further comprises a fifth node comprising an instruction to perform one or more of a rendering process, translucency process, shading process, or rasterizing process.

5. The method of claim 4, wherein rendering the image comprises rendering the image using a result from the one or more of the rendering process, translucency process, shading process, or rasterizing process.

6. The method of claim 1, wherein the visual effect to be selected for the subset of the set of animation objects comprises a look, an associated light source, a texture, or a material.

7. The method of claim 1, wherein an output of the second node is connected to an input of the third node in the dependency graph.

8. The method of claim 1, wherein an output of the third node is connected to an input of the fourth node in the dependency graph.

9. A non-transitory computer-readable storage medium comprising computer-executable instructions for rendering an image using a dependency graph, the computer-executable instructions comprising instructions for:
    accessing a dependency graph, the dependency graph comprising a plurality of interconnected nodes;
    accessing a set of animation objects, the set of animation objects stored at a first node of the plurality of interconnected nodes;
    accessing a partition criterion stored at a second node of the plurality of interconnected nodes;
    subsequent to accessing the partition criterion, selecting, based on the partition criterion, a subset of the set of animation objects;
    accessing the subset of the set of animation objects;
    selecting a visual effect, the visual effect stored at a third node of the plurality of interconnected nodes;
    accessing an instruction to render the image, the instruction to render the image stored at a fourth node of the plurality of interconnected nodes;
    subsequent to accessing the visual effect stored at the third node and in response to accessing the instruction to render the image, rendering the image based on the subset of the set of animation objects and the selected visual effect.

10. The non-transitory computer-readable storage medium of claim 9, wherein selecting, based on the partition criterion, the subset of the set of animation objects comprises selecting animation objects that satisfy the partition criterion from the set of animation objects and not selecting, from the set of animation objects, animation objects that do not satisfy the partition criterion, the set of animation objects received at an input of the second node.

11. The non-transitory computer-readable storage medium of claim 9, wherein the partition criterion comprises one or more of an object configuration, object attribute, object name, an object type, a geometry name, a part name, a material, or a proximity characteristic.

12. The non-transitory computer-readable storage medium of claim 9, wherein the dependency graph further comprises a fifth node comprising an instruction to perform one or more of a rendering process, translucency process, shading process, or rasterizing process.

13. The non-transitory computer-readable storage medium of claim 12, wherein rendering the image comprises rendering the image using a result from the one or more of the rendering process, translucency process, shading process, or rasterizing process.

14. The non-transitory computer-readable storage medium of claim 9, wherein the visual effect to be selected for the subset of the set of animation objects comprises a look, an associated light source, a texture, or a material.

15. The non-transitory computer-readable storage medium of claim 9, wherein an output of the second node is connected to an input of the third node in the dependency graph.

16. The non-transitory computer-readable storage medium of claim 9, wherein an output of the third node is connected to an input of the fourth node in the dependency graph.

17. An apparatus for rendering an image using a dependency graph, the apparatus comprising:
a memory configured to store a dependency graph; and
a computer processor configured to:
    access the dependency graph, the dependency graph comprising a plurality of interconnected nodes;
    access a set of animation objects, the set of animation objects stored at a first node of the plurality of interconnected nodes;
    access a partition criterion stored at a second node of the plurality of interconnected nodes;
    subsequent to accessing the partition criterion, select, based on the partition criterion, a subset of the set of animation objects;
    access the subset of the set of animation objects;
    select a visual effect, the visual effect stored at a third node of the plurality of interconnected nodes;
    access an instruction to render the image, the instruction to render the image stored at a fourth node of the plurality of interconnected nodes;
    subsequent to accessing the visual effect stored at the third node and in response to accessing the instruction to render the image, render the image based on the subset of the set of animation objects and the selected visual effect.

18. The apparatus of claim 17, wherein selecting, based on the partition criterion, the subset of the set of animation objects comprises selecting animation objects that satisfy the partition criterion from the set of animation objects and not selecting, from the set of animation objects, animation objects that do not satisfy the partition criterion, the set of animation objects received at an input of the second node.

19. The apparatus of claim 17, wherein the partition criterion comprises one or more of an object configuration, object attribute, object name, an object type, a geometry name, a part name, a material, or a proximity characteristic.

20. The apparatus of claim 17, wherein the dependency graph further comprises a fifth node comprising an instruction to perform one or more of a rendering process, translucency process, shading process, or rasterizing process.

21. The apparatus of claim 20, wherein rendering the image comprises rendering the image using a result from the one or more of the rendering process, translucency process, shading process, or rasterizing process.

22. The apparatus of claim 17, wherein the visual effect to be selected for the subset of the set of animation objects comprises a look, an associated light source, a texture, or a material.

23. The apparatus of claim 17, wherein an output of the second node is connected to an input of the third node in the dependency graph.

24. The apparatus of claim 17, wherein an output of the third node is connected to an input of the fourth node in the dependency graph.

* * * * *